Nov. 11, 1924.
C. C. MILES
1,515,265
PASTING MACHINE
Filed Nov. 1 1920     7 Sheets-Sheet 1
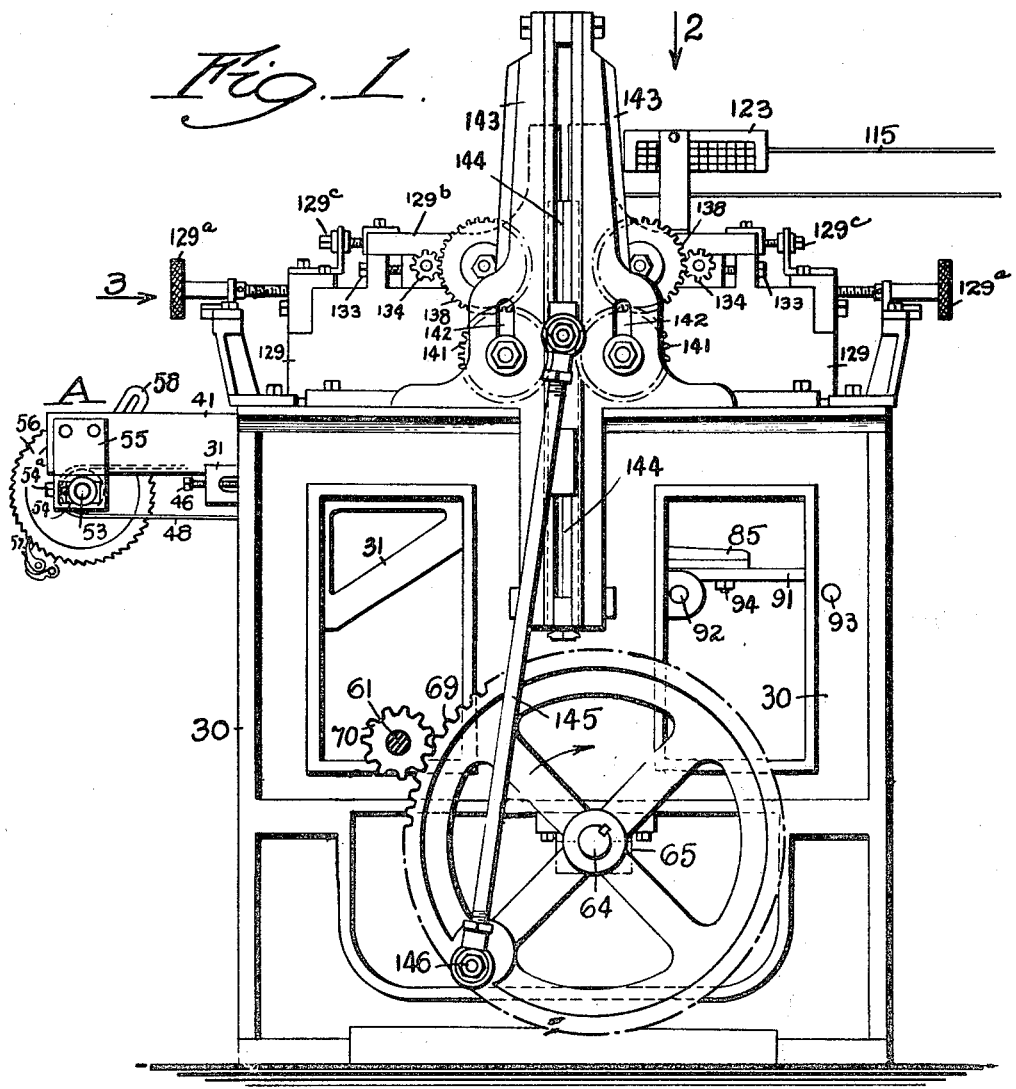

Nov. 11, 1924.
C. C. MILES
PASTING MACHINE
Filed Nov. 1 1920 7 Sheets-Sheet 2
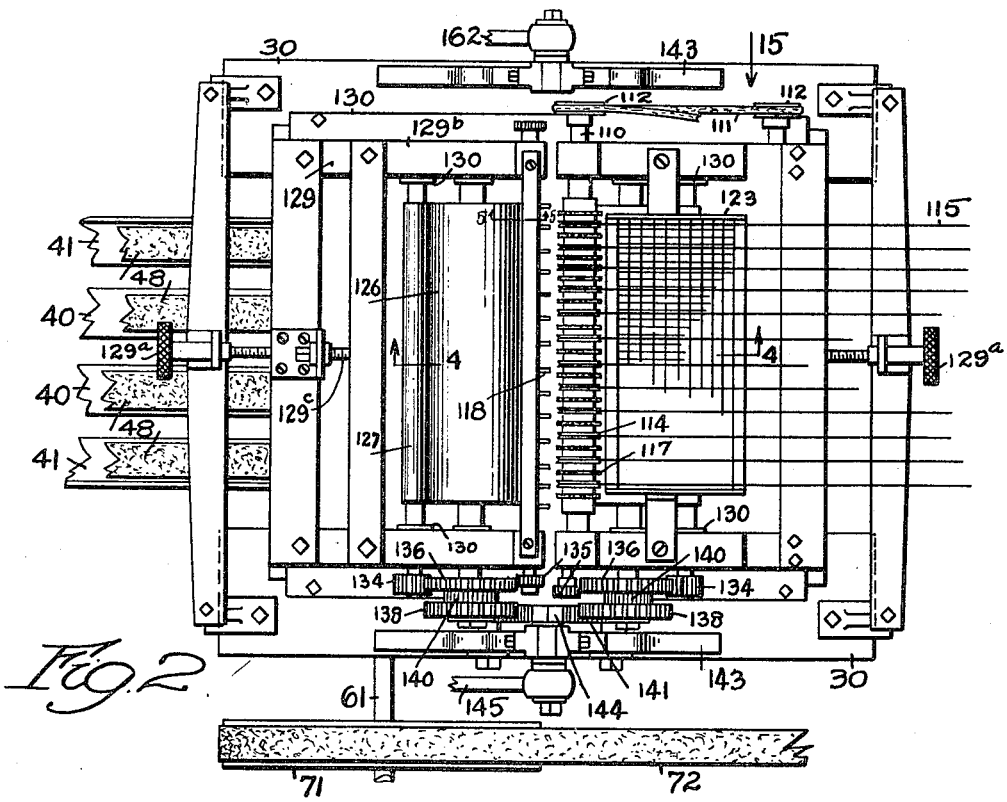
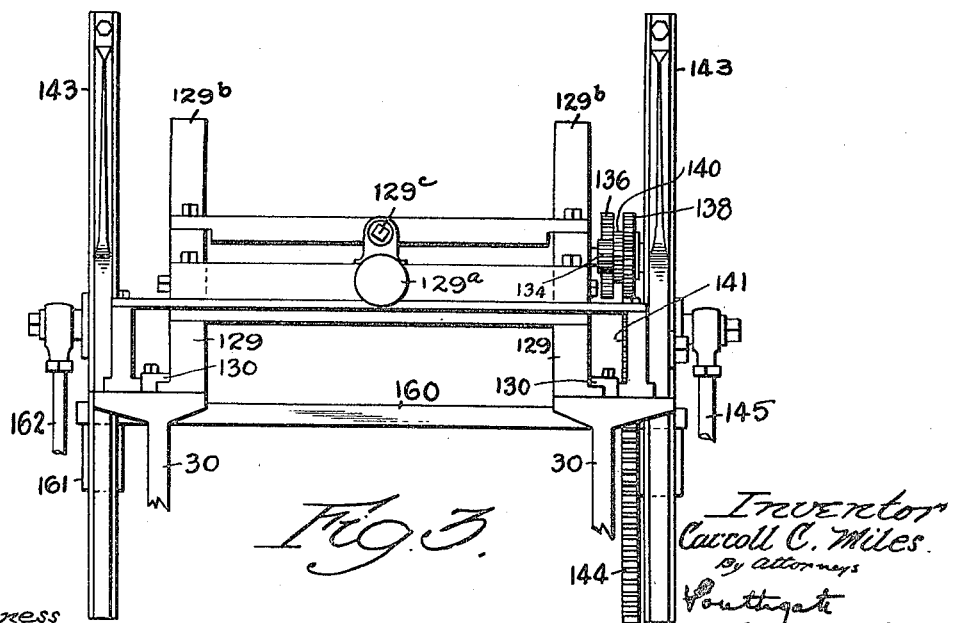

Nov. 11, 1924. 1,515,265
C. C. MILES
PASTING MACHINE
Filed Nov. 1, 1920  7 Sheets-Sheet 3
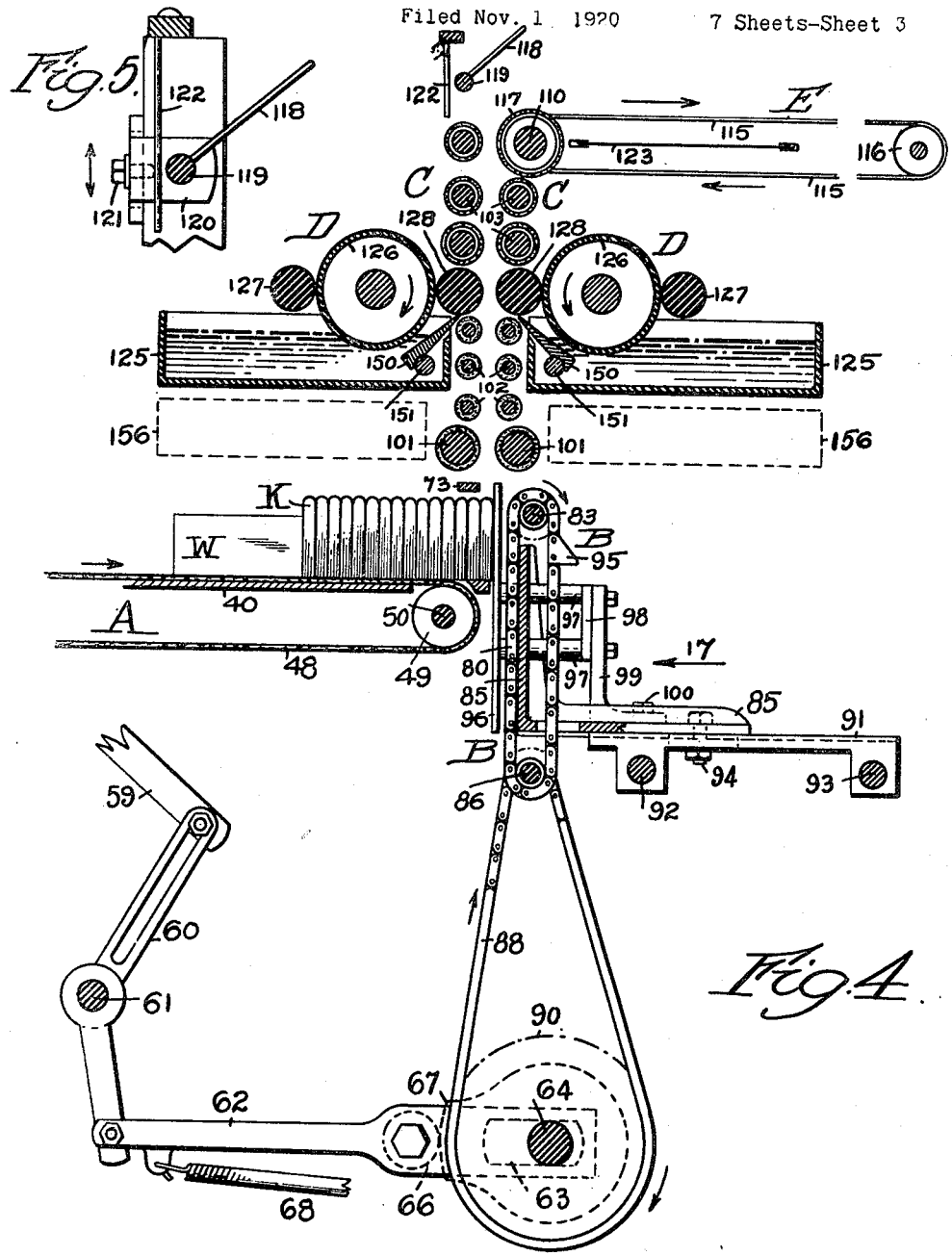
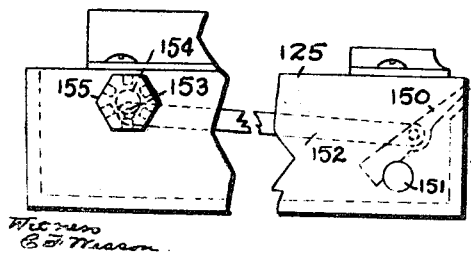

Nov. 11, 1924.                                              1,515,265
C. C. MILES
PASTING MACHINE
Filed Nov. 1 1920            7 Sheets-Sheet 4
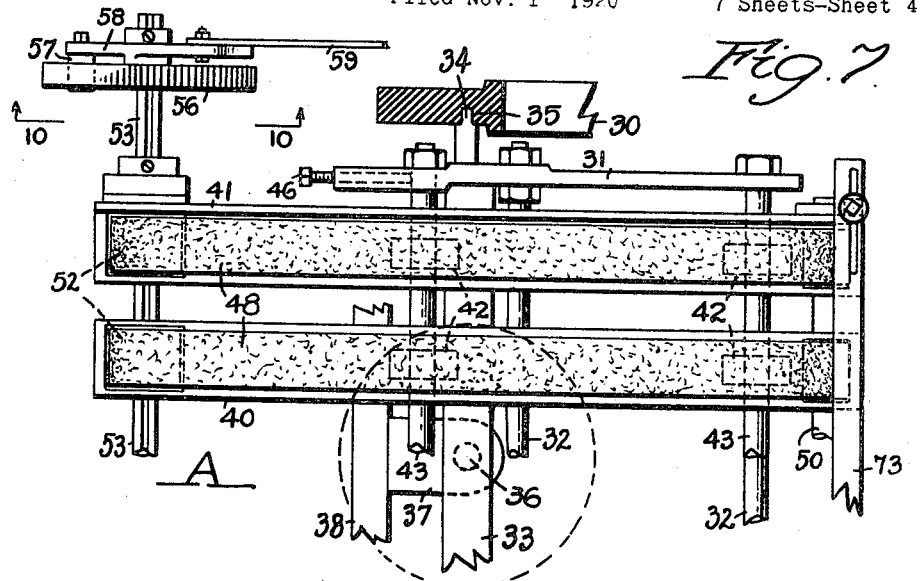
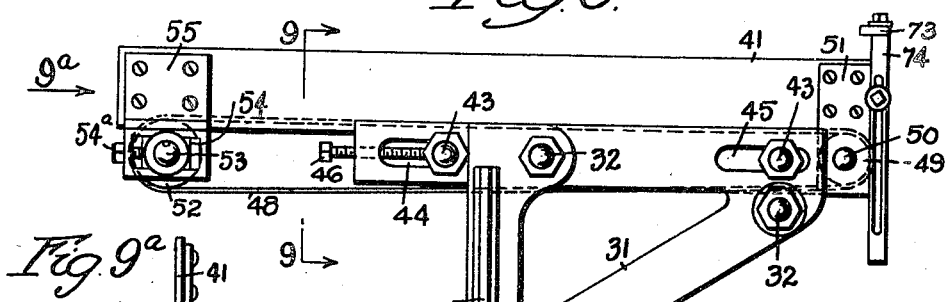
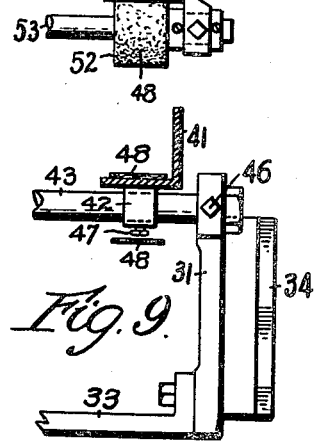
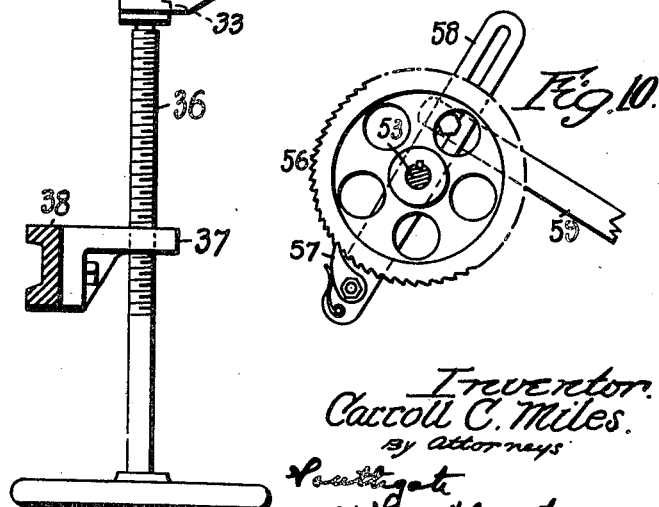
Inventor.
Carroll C. Miles.
By Attorneys
Southgate
& Southgate
Witness
C. F. Nisson Nov. 11, 1924.  
C. C. MILES  
PASTING MACHINE  
Filed Nov. 1, 1920  
1,515,265  
7 Sheets-Sheet 5
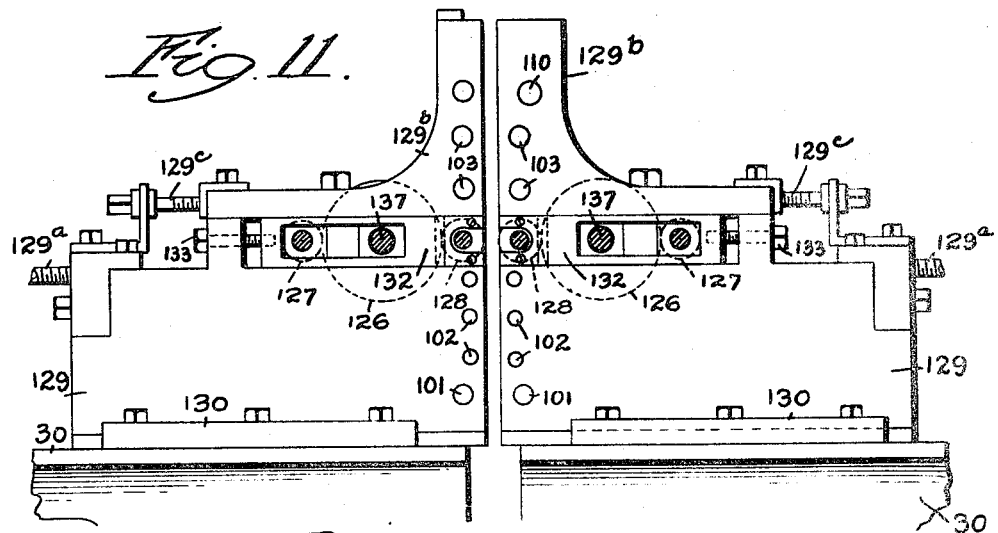
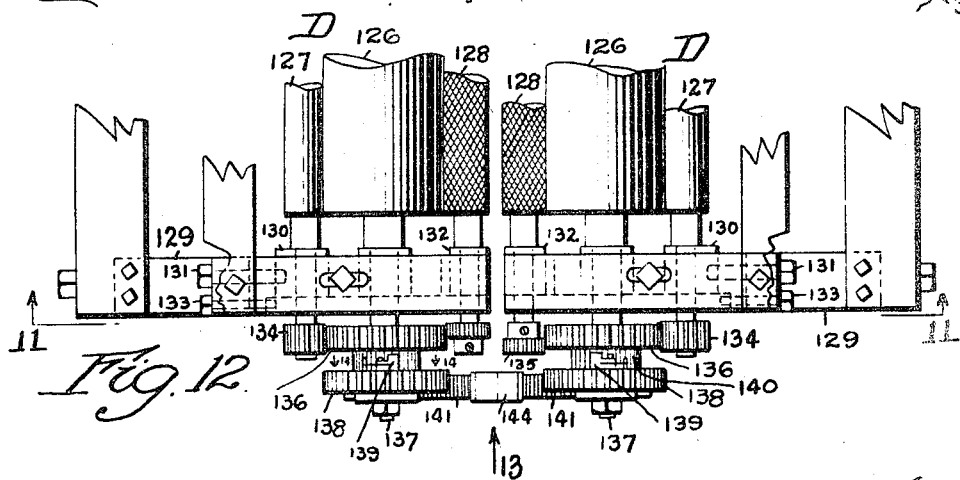
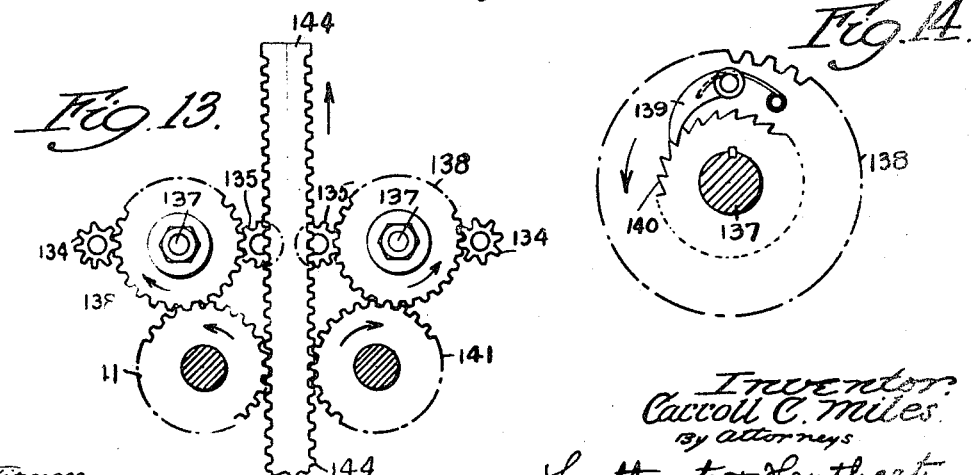

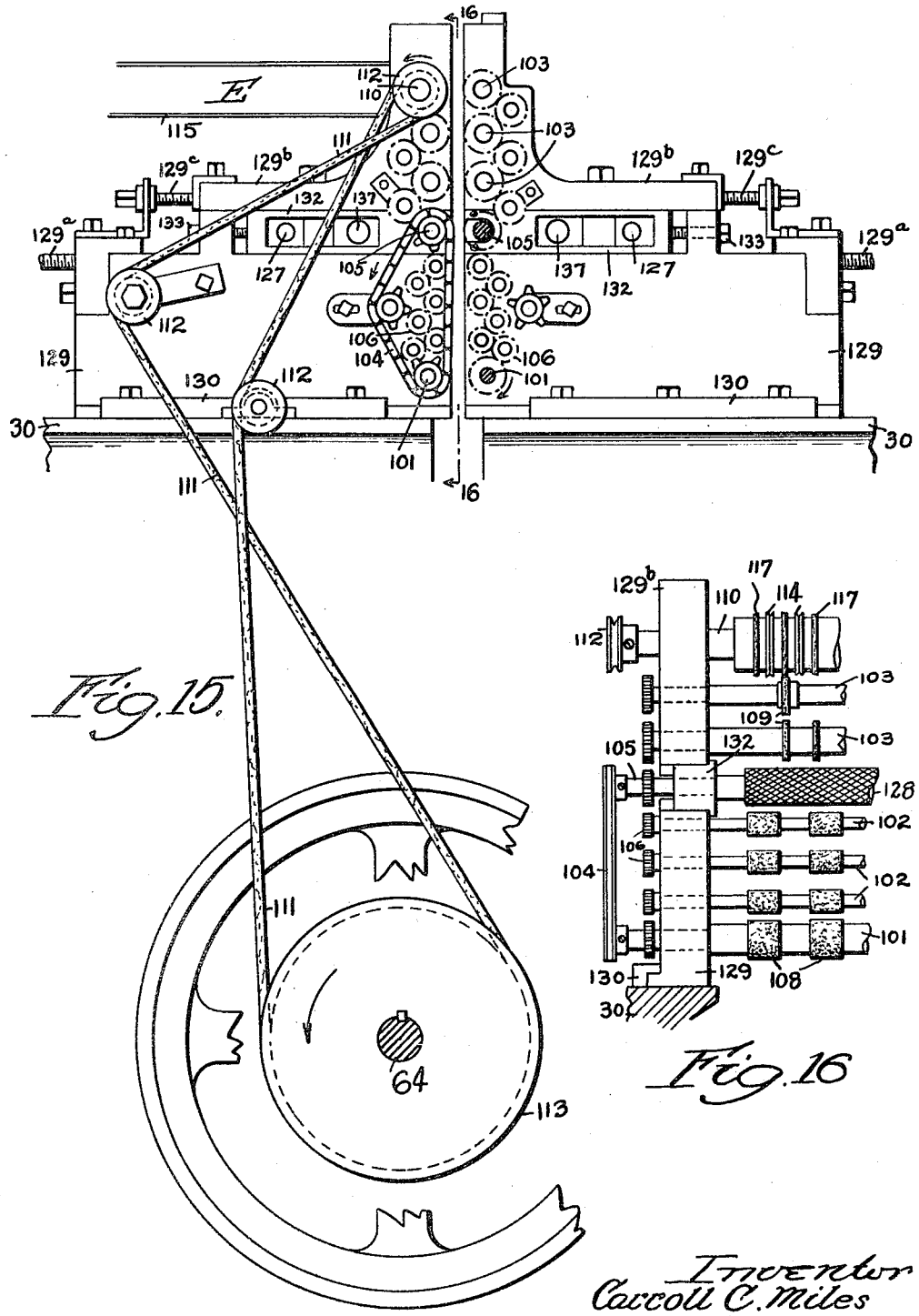

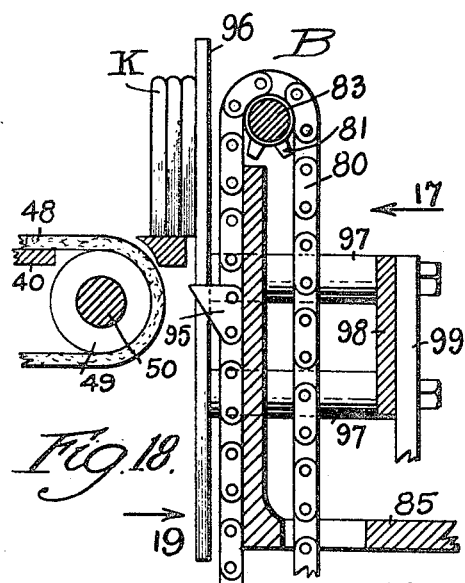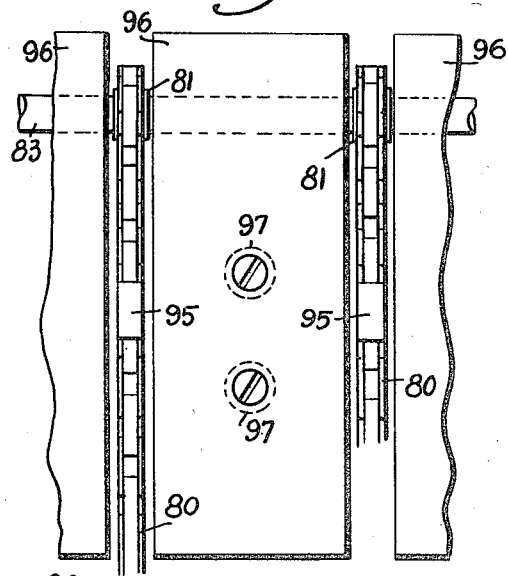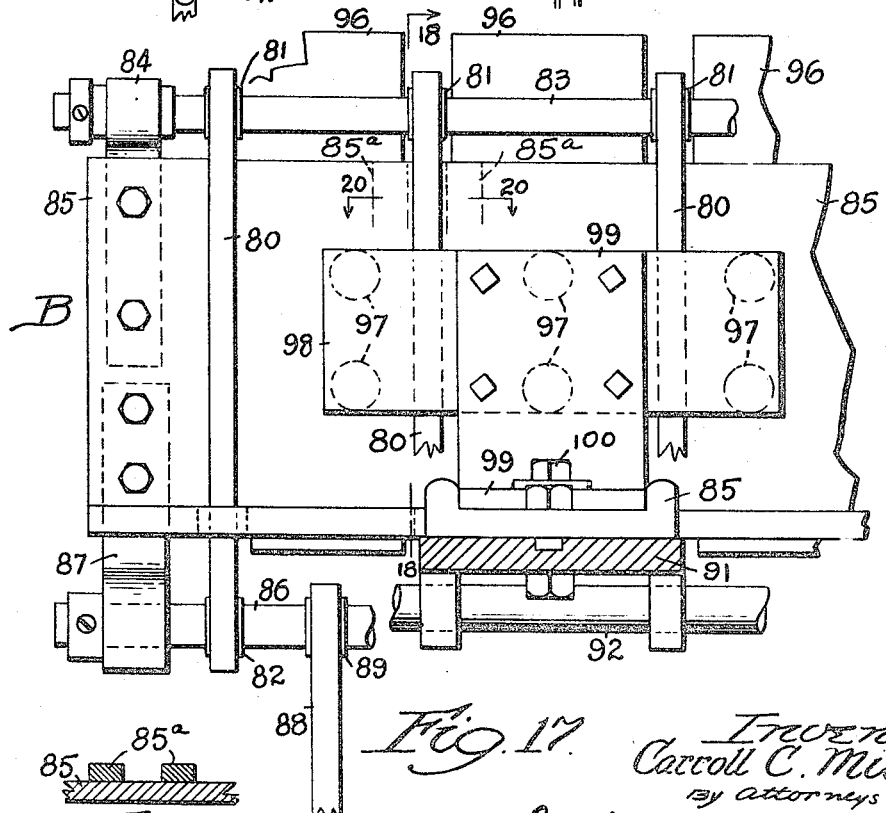

Patented Nov. 11, 1924.

1,515,265

UNITED STATES PATENT OFFICE.

CARROLL C. MILES, OF SOUTH LANCASTER, MASSACHUSETTS.

PASTING MACHINE.

Application filed November 1, 1920. Serial No. 420,867.

*To all whom it may concern:*

Be it known that I, CARROLL C. MILES, a citizen of the United States, residing at South Lancaster, in the county of Worcester and State of Massachusetts, have invented a new and useful Pasting Machine, of which the following is a specification.

This invention relates to a machine for applying paste or other adhesive to the outer surfaces of books, pamphlets, or other articles prior to the application of covering material thereto. It is particularly adapted for work to be covered with cloth or other flexible material requiring attachment over the entire outer surface thereof.

It is the general object of my invention to provide a machine by which this pasting operation may be quickly and accurately performed and by which the use of manual labor in the pasting operation is entirely eliminated, except for occasional renewal of the supply of articles to be pasted.

With this general object in view, one important feature of my invention relates to the provision of improved conveying devices and actuating mechanism therefor, by which the articles to be pasted, of any desired size or thickness, may be quickly and accurately passed through the machine.

Another feature of my invention relates to improved pasting mechanism and to provision for adapting the same to articles of different thicknesses.

My invention further relates to arrangements and combinations of parts which will be hereinafter described and more particularly pointed out in the appended claims.

A preferred form of my invention is shown in the drawings in which—

Fig. 1 is a front elevation of my improved machine;

Fig. 2 is a plan view thereof;

Fig. 3 is an end elevation of parts of the conveying and feeding mechanism;

Fig. 4 is a sectional front elevation, taken along the line 4—4 in Fig. 2;

Fig. 5 is a detail sectional elevation, taken along the line 5—5 in Fig. 2;

Fig. 6 is a front elevation of one of the paste holding pans;

Fig. 7 is a partial plan view of the feeding conveyor mechanism;

Fig. 8 is a front elevation thereof;

Fig. 9 is a sectional end elevation, taken along the line 9—9 in Fig. 8;

Fig. 9ª is a detail end elevation, looking in the direction of the arrow 9ª in Fig. 8;

Fig. 10 is a sectional elevation of the conveyor actuating mechanism, taken along the line 10—10 in Fig. 7;

Fig. 11 is a front elevation of the paste feed mechanism, the shafts being shown in section along the line 11—11 in Fig. 12;

Fig. 12 is a partial plan view of the pasting mechanism;

Fig. 13 is a front elevation of the gear connection to the pasting mechanism, looking in the direction of the arrow 13 in Fig. 12;

Fig. 14 is a rear elevation of a pawl and ratchet connection, taken along the line 14 in Fig. 12;

Fig. 15 is a rear elevation, showing the driving connections for different parts of the conveying mechanism;

Fig. 16 is a partial sectional end elevation, taken along the line 16—16 in Fig. 15;

Fig. 17 is a partial end elevation of the chain conveyor mechanism, looking in the direction of the arrow 17 in Figs. 4 and 18;

Fig. 18 is a sectional elevation of the conveyor, taken along the line 18—18 in Fig. 17;

Fig. 19 is a detail end elevation, looking in the direction of the arrow 19 in Fig. 18; and Fig. 20 is a detail sectional plan view, taken along the line 20—20 in Fig. 17.

Referring to the drawings, my improved pasting machine comprises a frame 30 on which is mounted a feeding conveyor indicated generally by the letter A (Fig. 4), a chain conveyor mechanism B, conveyor rolls and driving mechanism therefor indicated by the letter C, pasting mechanism D and cord conveying mechanism E by which the books or other articles are removed from the machine.

Throughout the remainder of the specification and in the claims the word "book" will be used to designate the article to which paste is applied, it being understood that this term covers either books or pamphlets or any other similar article for which the machine is adapted.

The general operation of the machine is best shown in Fig. 4. The books K are placed on the feeding conveyor A and are intermittently advanced toward the chain conveyor mechanism B, which removes the books singly from the conveyor A and moves them into position to be gripped by the conveyor rolls C. These rolls carry the books past the pasting mechanism D by which paste is applied to the side surfaces of each book. The feed rolls C then deliver the books to the cord conveyor E which removes them from the machine and permits them to be thereafter disposed of as desired.

Referring particularly to Figs. 7 to 10, I will now describe the feeding conveyor A. This mechanism is mounted upon a conveyor frame comprising triangular side plates 31 connected by tie rods 32 and a cross bar 33. The side plates 31 are provided with projecting guiding ribs 34 (Fig. 7) vertically slidable in grooves 35 in the machine frame 30. An adjusting screw 36 is threaded in a bracket 37 secured to a cross bar 38 forming a part of the machine frame. The upper end of the screw 36 engages the cross bar 33 of the conveyor frame and constitutes means for vertically adjusting and supporting the conveyor frame.

A plurality of guide bars 40 and 41 are mounted for lateral adjustment on the rods 32. The intermediate guide bars 40 are in the form of flat plates and the outside bars 41 are in the form of angle irons. All of the guide bars 40 and 41 are provided with blocks or projections 42 on their lower sides, slidable on cross rods 43 mounted in the conveyor frame and adjustable in slots 44 and 45 in the side plates 31. Adjusting screws 46 (Figs. 7 and 8) are provided for positioning the rods 43 in the conveyor frame and the guide plates are held in adjusted lateral position on the rods 43 by set screws 47 (Fig. 9) in the blocks 42.

A conveyor tape 48 rests on each guide bar 40 or 41 and near the inner end of its bar each tape passes around a guide roll 49. The rolls 49 are movably mounted on a shaft 50 which in turn is supported in bearing plates 51 secured to the angle irons 41. Near the outer ends of the plates 40 and 41 the tapes pass over driving rolls 52 keyed to a shaft 53 but slidable axially thereon. The rolls 49 and 52 project through slots or openings near the ends of the bars 40 or 41 and move sidewise with the bars when the latter are adjusted on the cross rods 43.

The shaft 53 is supported in bearing blocks 54 which are adjustable in brackets 55 secured to the angle irons 41. The blocks 54 may be adjusted by means of screws 54ᵃ to provide the proper tension for the conveyor tapes 48. A ratchet wheel 56 is secured to the outer end of the shaft 53 and is engaged by a pawl 57 (Fig. 10) mounted on a slotted feed lever 58 loosely pivoted on the end of the shaft 53. A link 59 is adjustably connected at one end to the slotted lever 58 and at the opposite end to a slotted lever 60 (Fig. 4) loosely pivoted on a drive shaft 61 having its bearings in the frame 30. A link 62 is connected at one end to the depending arm of the lever 60 and is provided at the opposite end with a slot or opening 63 embracing a shaft 64 supported in bearings 65 (Fig. 1) on the frame 30.

A cam roll 66 is mounted on the link 62 and is held in yielding engagement with a cam 67 on the shaft 64 by a spring 68 secured at one end to the link 62 and at the opposite end to a convenient fixed point on the machine. A gear 69 on the shaft 64 is engaged by a pinion 70 on the drive shaft 61 (Fig. 1) which latter shaft may be rotated by a pulley 71 (Fig. 2) and belt 72 or in any other convenient manner.

The pawl lever 58 (Fig. 10) is thus regularly oscillated by the cam 67 and, by suitably adjusting the link 59, the feeding stroke may be varied so that the intermittent advance of the tapes will be adapted to the size of the particular book upon which the machine is employed. A cross bar 73 (Figs. 7 and 8) has a slotted connection with uprights 74 mounted on the bearing plates 51 and vertically adjustable thereon. The height of the bar 73 may thus be adjusted to the size of the work and the bar acts as a guide for the books as they are removed from the feeding conveyor by the chain conveyor mechanism B.

This mechanism, best shown in Figs. 17 to 20, comprises a plurality of conveyor chains 80 mounted on upper sprockets 81 and lower sprockets 82. The sprockets 81 are supported on an upper shaft 83 mounted in bearings 84 (Fig. 17) secured to the upright portion of a bracket 85. The lower sprockets 82 are similarly mounted on a drive shaft 86 supported in bearings 87 depending from the bracket 85. A chain 88 connects a small sprocket 89 on the shaft 86 with a larger sprocket 90 (Fig. 4) on the shaft 64 and constitutes a driving connection for the chain conveyor. Guides 85ᵃ (Fig. 20) on the bracket 85 prevent lateral displacement of the chains 80.

The bracket 85 is slidably mounted on a stand 91 (Fig. 4) fixed to tie rods 92 and 93 secured to the machine frame 30. A bolt 94 may be used to secure the bracket 85 to the stand 91 in the desired adjusted position.

Each conveyor chain 80 is provided with one or more teeth or projections 95 extending through slots or openings between the sections of a stop plate 96 (Figs. 18 and 19). Each section of the plate 96 is secured by studs 97 to a plate 98 supported by a bracket 99, adjustable on the bracket 85 above described and secured thereto by a bolt or screw 100.

The bracket 99 may thus be adjusted on the bracket 85 so that the teeth 95 on the conveyor chains shall project such a distance through the stop plate 96 as is best adapted to the particular work in the machine. The bracket 85 may then be adjusted on the stand 91 so that the books will be stopped in correct position beneath the feed roll mechanism C.

The travel of the conveyor chains is so arranged that one tooth 95 on each chain comes into operation to remove a book from the conveyor A for every rotation of the cam 67 and for every actuation of the ratchet feed of said conveyor. It is customary to place a considerable number of books on the conveyor and to then place a weight W (Fig. 4) on the conveyor to be moved by the tapes and to thus advance the books intermittently toward the chain conveyor B.

As the books are raised by the chain conveyor they are delivered singly to the feed roll mechanism C, best shown in Figs. 4, 15 and 16. This mechanism comprises a pair of relatively large rolls 101 (Fig. 4) and several pair of smaller rolls 102 below the pasting mechanism and also two or more sets of rolls 103 above the pasting mechanism.

The lower rolls 101 are preferably driven by sprocket chains 104 (Fig. 15) from pasting roll shafts 105 to be described. The rolls 102 are driven from the rolls 101 by positive gearing 106 so that the rolls in each set are all rotated in the same direction and with the same surface speed. The upper rolls 103 are driven at the same surface speed by direct gear connection from the pasting roll shafts 105, as clearly shown in Fig. 15.

The lower rolls 101 and 102 are provided with relatively wide rubber sections 108 for firmly engaging and advancing the books to be pasted, and the upper rolls 103 are provided with relatively narrow rubber sections 109 making only sufficient contact with the pasted books to prevent slipping thereof. The books are delivered by the upper rolls 103 to a cord conveyor E, shown in Figs. 2, 4, 15 and 16.

The conveyor E comprises a driving shaft 110 continuously rotated by a belt 111 (Fig. 15) passing around guide pulleys 112 and connecting the shaft 110 with a pulley 113 on the cam shaft 64. The shaft 110 supports a plurality of grooved pulleys or rolls 114 (Figs. 2 and 16). Cords 115 pass around the pulleys 114 and are driven thereby, the outer portions of the cords being supported by guide rolls 116 (Fig. 4). The shaft 110 is also provided with narrow rubber sections 117 (Fig. 16) interposed between the rolls 114 and co-operating with the upper feed roll 103 to deliver the pasted books to the conveyor E.

Inclined guide rods 118 (Figs. 4 and 5) are provided to direct the articles to the conveyor E. The rods 118 are fixed in a cross shaft 119 secured at its ends to supports 120 which may be held by binding screws 121 in vertically adjusted position on one of the stands for the pasting mechanism to be described. Vertical guide bars 122 are also provided to prevent the possible delivery of a book in the wrong direction from the feed roll mechanism C. A wire pan or basket 123 is disposed between the upper and lower runs of the cords 115 to prevent any book from slipping between the conveyor cords 115 and falling upon the pasting mechanism D.

The pasting mechanism D comprises paste pans 125 at each side of the feed rolls, each pan being provided with a paste feed roll 126, a wiper roll 127 and a pasting roll 128. Each paste feed roll 126 is mounted in fixed bearings in a frame or stand 129 mounted to slide in fixed guide ways 130 on the frame 30. Each wiper roll 127 is mounted in bearings 130 movable toward and from its feed roll 126 by adjusting screws 131 (Fig. 12). Each pasting roll 128 is similarly mounted in bearings 132 adjustable toward and from its feed roll 126 by adjusting screws 133.

Each pasting roll and wiper roll may thus be set at any desired distance from its paste feed roll and the distance between the two pasting rolls 128 may be varied by adjusting and clamping the stands 129 in their guide ways 130. Adjusting screws 129ª (Fig. 2) are provided for moving the stands.

Pinions 134 and 135 (Fig. 12) on the wiper and pasting rolls connect these rolls through a gear 136 to the paste feed roll shaft 137. A gear 138 (Fig. 14) is loosely mounted on the outer end of each feed roll shaft 137 and supports a pawl 139 yieldingly engaging a ratchet 140 fixed to the shaft 137. Additional gears 141 (Fig. 13) are vertically adjustable in slots 142 (Fig. 1) in upward extensions 143 of the frame 30. By vertically adjusting the gears 141 they may be caused to mesh correctly with the feed roll gears 138 in every position thereof.

The gears 141 are engaged by the teeth of a double rack 144 mounted for vertical reciprocation in guide ways in the frame portions 143 and connected by a link 145 (Fig. 1) to a crank pin 146 fixed in the outer face of the gear 69. As the gear is rotated the rack 144 is vertically reciprocated and on each upward stroke intermittently rotates the rolls 126, 127 and 128 through the ratchet connection on the paste feed roll shafts 137. As the feed rolls 101, 102 and 103 are positively connected to the pasting rolls 128, these rolls are also intermittently advanced at each upward movement of the rack 144.

The feed rolls 101 and 102 are preferably mounted directly on the stands 129 and the rolls 103 may be mounted in separate upper bearing brackets 129ᵇ, adjustable on the stands 129 by adjusting screws 129° (Figs. 1 and 2).

It will be noted that the shaft 64 is located at one side of the path of movement of the rack 144 resulting in a more direct action during the upward stroke, as the arc of movement of the crank pin 146 is more nearly in line with the path of movement of the rack 144 during its upward feeding movement than during its idle downward return movement.

Each paste pan 125 is provided with a scraper blade 150 (Figs. 4 and 6) by which the amount of paste on the pasting rolls may be controlled. Each scraper 150 is mounted on a cross shaft 151 pivoted in bearings in the side walls of the pan 125 and is connected by a link 152 to an eccentric pin 153 mounted on a short shaft 154 extending through the side of the pan and having a head 155 by which the shaft may be turned to vary the position of the pin 153 and thus adjust the scraper 150. It will be understood that the term paste, as used herein, includes also glue. When hot glue is required, a water pan or other heating device 156 (Fig. 4) may be provided for each paste pan 125.

For heavy work it is sometimes desirable to provide a positive upward feed of the books past the pasting rolls and for this purpose I provide a blade 160 (Figs. 2 and 3) detachably secured to the upper end of the double rack bar at one end and to a sliding block 161 at the opposite end. The block 161 is connected by a link 162 to a crank pin (not shown) at the rear of the machine, corresponding in position and operation to the crank pin 146. When the feed rolls are to be used the blade 160 is removed from its operative position and when the blade is used the chain conveyor B may be removed.

Having fully described the details of construction of my improved pasting machine, the method of operation thereof will be seen to be simple and effective. It is merely necessary to provide a sufficient supply of books on the feeding conveyor A and to make suitable disposal of the books delivered from the machine by the cord conveyor E. The books presented by the conveyor A are advanced singly by the chain conveyor B to the feed roll mechanism C, which moves the books past the pasting mechanism D and delivers them to the cord conveyor E.

It will be noted that all parts of the machine are so designed and constructed that it may be easily adapted to operate upon books of any shape or thickness.

Having thus described my invention it will be evident that changes and modifications can be made therein by those skilled in the art within the spirit and scope of my invention as set forth in the claims and I do not wish to be otherwise limited to the details herein disclosed, but what I claim is:

1. In a pasting machine, a pair of spaced pasting rolls, means to adjust said rolls, to vary the distance between them, gears to drive said rolls, a rack for said gears, and means to reciprocate said rack.

2. In a pasting machine, a pair of pasting rolls, a vertically movable double rack, and positive driving connections between said rack and said rolls, effective to rotate said rolls simultaneously when said rack is moved in one direction only.

3. In a pasting machine, a pair of separated paste feed rolls, means to adjust said rolls towards and from each other, gears on said rolls, additional gears adjustable vertically to maintain engagement therewith, a double rack, and means to reciprocate said rack between said additional gears to rotate said gears and rolls.

4. In a pasting machine, a pair of spaced pasting rolls, means to adjust said rolls, gears to drive said rolls, a rack for said gears, and means to reciprocate said rack, said means including a crank-pin having its axis of rotation out of alignment with the path of movement of said rack.

5. In a pasting machine, a pair of spaced pasting rolls, means to adjust said rolls to vary the distance between them, and a positive reversing gear drive for said rolls in every position thereof, said drive including a ratchet connection to said rolls providing intermittent rotation thereof in one direction only.

6. In a pasting machine, a pair of paste feed rolls, a stand for each roll, a wiper roll and a pasting roll for each paste feed roll, mounted in said stands, means to separately adjust said latter rolls relative to said feed rolls, and additional means to adjust said stands to vary the distance between said pasting rolls.

7. In a pasting machine, a frame, a pair of stands separately adjustable on said frame, towards and from each other, paste feed rolls mounted in bearings fixed in said stands, wiper and pasting rolls for each paste feed roll, separate bearings for said latter rolls in said stands, and means to separately adjust said bearings in said stands.

8. In a pasting machine, a pasting roll, a paste pan, a scraper for said roll pivotally mounted in said pan, and adjusting means for said scraper comprising an eccentric pin, means to adjust said pin, and a link-connection between said pin and said scraper.

9. In a pasting machine, a pair of pasting rolls, a feeding mechanism, a chain conveyor mounted to travel in a path perpendicular to the movement of said feeding mechanism, and projections on said chain conveyor effective to engage and remove articles singly from said feeding mechanism and to advance and enter said articles between said pasting rolls.

10. In a pasting machine, a pair of pasting rolls, means to rotate said rolls, a plurality of feed rolls effective to forward articles to and past said pasting rolls, and means to drive said feed rolls in fixed timed relation to said pasting rolls.

11. In a pasting machine, a pair of pasting rolls, means to rotate said rolls in different spaced positions, a plurality of feed rolls effective to forward articles to and past said pasting rolls, and a positive chain and gear connection between said pasting rolls and said feed rolls.

12. In a pasting machine, a pair of pasting rolls, means to rotate said rolls, a plurality of feed rolls effective to forward articles past said pasting rolls, means to drive said feed rolls, a cord conveyor positioned at right angles to said feed rolls and effective to receive and remove articles delivered thereto by said feed rolls, and a guide to direct articles from said rolls to said cord conveyor.

13 In a pasting machine, a pair of pasting rolls, means to rotate said rolls, a plurality of feed rolls effective to forward articles vertically past said pasting rolls, means to drive said feed rolls, a cord conveyor horizontally positioned to receive and remove articles delivered thereto by said feed rolls, and a vertically adjustable inclined guide to direct articles from said rolls to said cord conveyor.

In testimony whereof I have hereunto affixed my signature.

CARROLL C. MILES.